Patented May 29, 1951

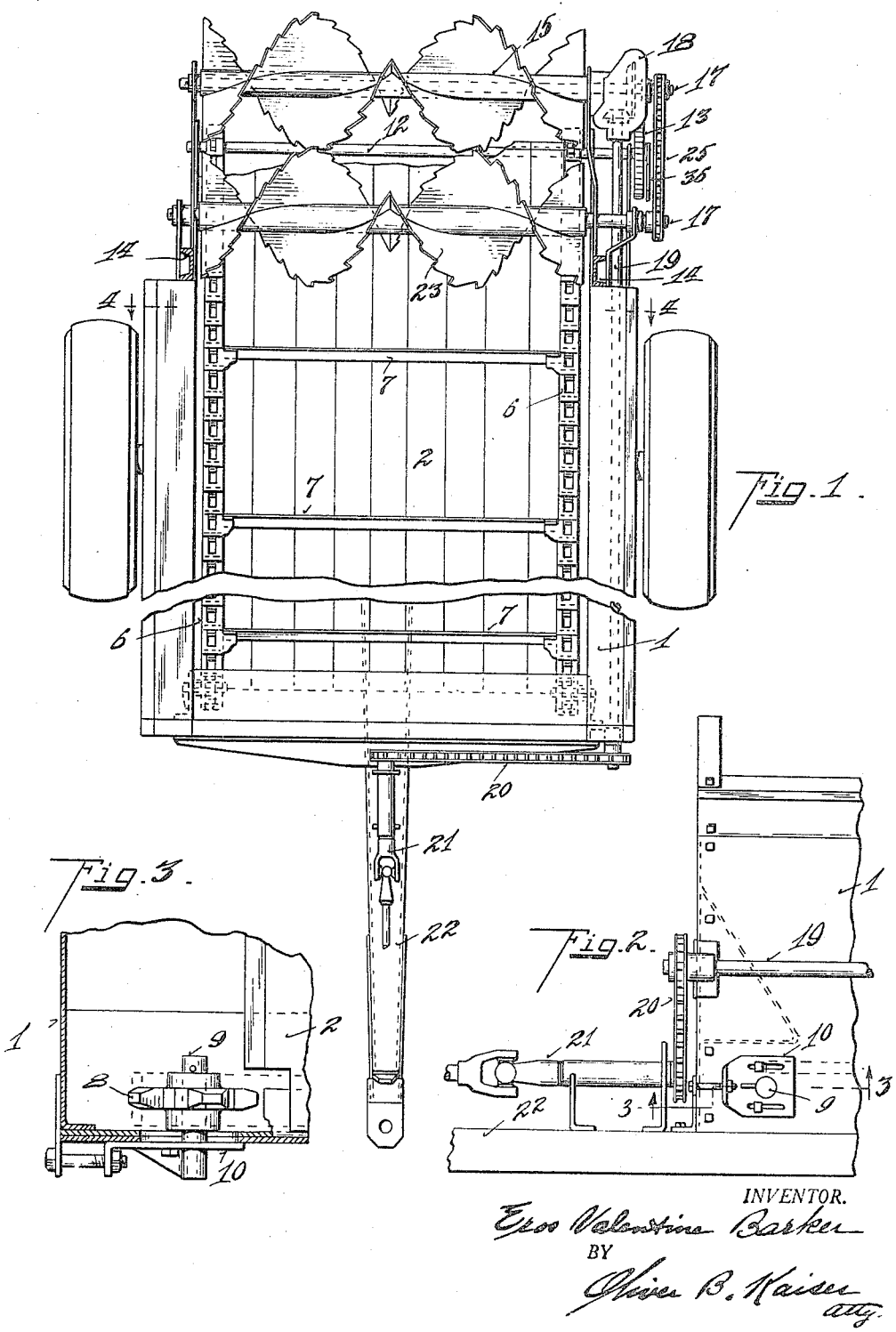

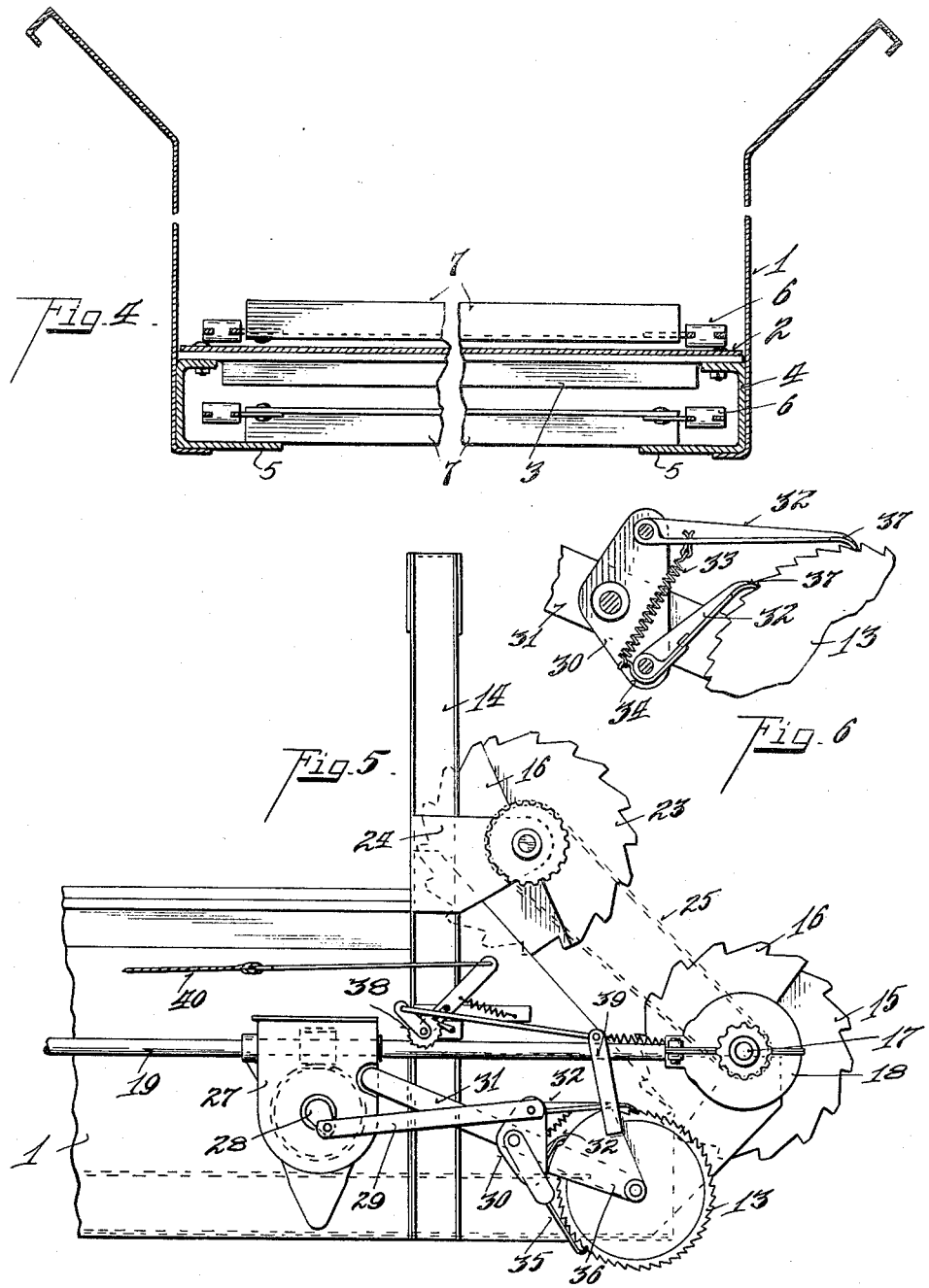

2,555,283

UNITED STATES PATENT OFFICE 2,555,283

FERTILIZER SPREADER

Eros Valentine Barker, Galion, Ohio, assignor to The Perfection Steel Body Company, Galion, Ohio, a corporation of Ohio Application November 15, 1947, Serial No. 786,257

1 Claim. (Cl. 275—5)

This invention relates to improvements in a class of vehicles commonly designated as manure spreaders for transporting a charge of soil fertilizing material, which before its discharge is disintegrated and pulverized and thence dispersed to spread and distribute the same upon the soil over which the vehicle is transported, or upon which the vehicle is standing.

These vehicles are produced as of a two-wheel trailer type to be hitched to and transported by a tractor or of four-wheel type, the type however being optional as the improvements to which the present invention is directed are applicable to either. The body of the vehicle is primarily of an all metal construction and in which its structure possesses certain advantages for dual functions.

Therefore an object of the invention is to provide the base of the body of the vehicle with a pair of sills of channel form in cross-section with the channel of each faced inwardly, the sills spaced and extending longitudinally of the sides of the body adapting the bottom flange of the sills to serve as rails to support and track the return span or run of an endless conveyor moving about the floor of the vehicle body to advance the charge carried by the body toward the discharge end, so that the gearing for transmitting the conveyor is relieved from carrying the weight of the conveyor.

As it is desirable to break up fertilizer material, such as manure in its feed advancing discharge from the body of the vehicle and to forcibly scatter or distribute the same, shredding and disintegrating means are provided at the discharge end of the body.

Another object of the invention is to provide a manure spreader with one or a pluraity of material disintegrating and distributing rolls adapted to act upon the material uniformly across the full width of the vehicle as distinguished from a chopping or pounding action effected by rotating relatively spaced blades or beaters by the provision of a roll or rolls, having a peripherally serrated spirally arranged vane upon an arbor extending longitudinally thereof and comprehensively for the full load carrying width of the vehicle body or its load discharging area to finely disintegrate the material as progressively advanced thereto for discharge and to centrifugally disperse the same for even and uniform distribution upon the soil over which the vehicle is transported.

The spirality of the peripherally serrated or toothed vane presents the teeth in a helix or helical line for a continuous and progressive shredding and disintegrating action against the bulk of material introduced or fed thereagainst during the rotative motion of the roll and to correspondingly centrifugally spray and spread upon the soil. The distribution density is regulatable by control of the feeding rate of the material advanced by a conveyor longitudinally of the vehicle body.

Another object is to provide a manure disintegrating and dispensing or spreading roll with a plurality of spiral peripherally serrated vanes longitudinally about an arbor, the compounding of the leads effecting a pitch reduction for the unit increasing the efficiency of the unit per cycle of revolution.

Another object is to divide each vane of the roll into alternate right and left hand helixes, preferably of uniform dimension meeting centrally of the length of the unit to provide for spreading evenly from the vehicle and from a distance from each side thereof.

Another object is to form a material disintegrating and distributing roll with peripherally serrated spiral vanes to diversify and increase its disintegrating action of the material as advanced against the roll.

Another object is to provide a plurality of material disintegrating and distributing rolls each having peripherally serrated spiral vanes extending longitudinally of the roll, the rolls in superposed arrangement with the upper roll staggered or in advance of the lower to act upon a high carriage of material in tiers.

Another object is to provide transmission means for intermittently advancing the material carried by the vehicle body for disintegration and distribution, readily and conveniently controlled from a remote point convenient to the operator for arresting or regulating the inching degree of material advance.

Various other features and advantages of the invention are more fully set forth in and apparent from the following description of the preferred embodiment as illustrated by the drawings accompanied herewith and forming a part of this specification, in which:

Figure 1 is a top plan view of the vehicle and manure spreader at its rear end, the vehicle being of a two-wheel trailer type.

Figure 2 is a side elevation of one side of the front end of the vehicle disclosing the power transmission adapted for a coupling connection with the transmission of a tractor and mounted upon the draft bar extending centrally from the 2,555,283 front end of the vehicle body for coupling the same to a draw bar of a tractor.

Figure 3 is a section on line 3, 3, Figure 2.

Figure 4 is an enlarged section on line 4, 4, Figure 1.

Figure 5 is an enlarged side elevation of one side of the rear end of the vehicle.

Figure 9:
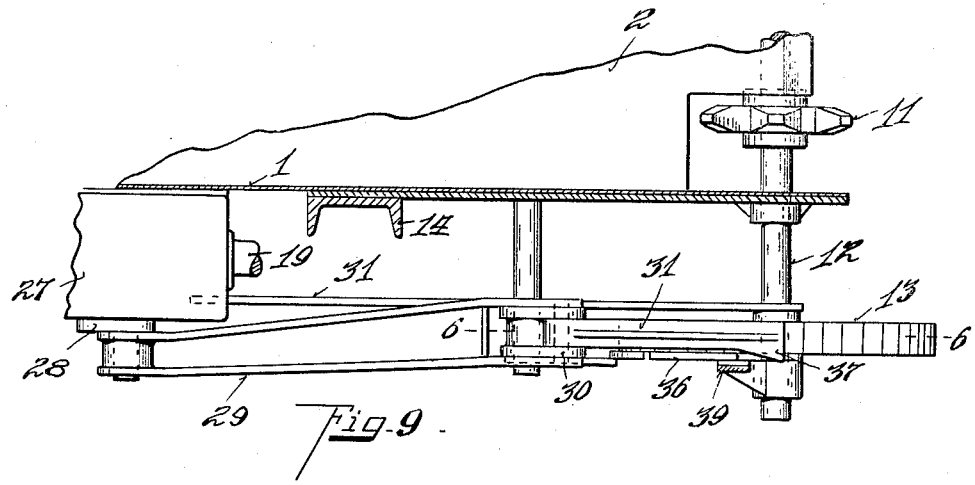

Figure 6 is a section on line 6, 6, Figure 9.

Figure 7:
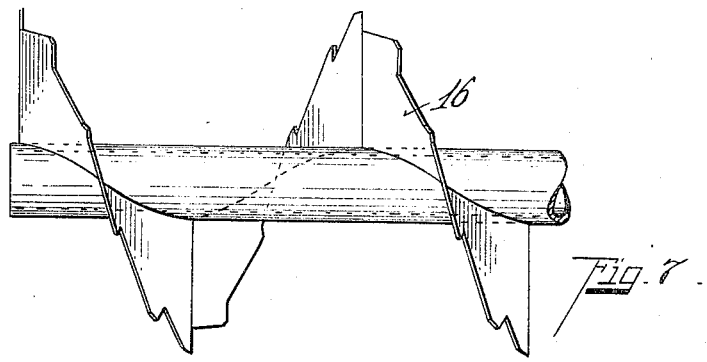

Figure 7 is a side elevation of a single right hand helical vane mounted upon an arbor for the left half of one of the disintegrator and distributor rolls.

Figure 8:
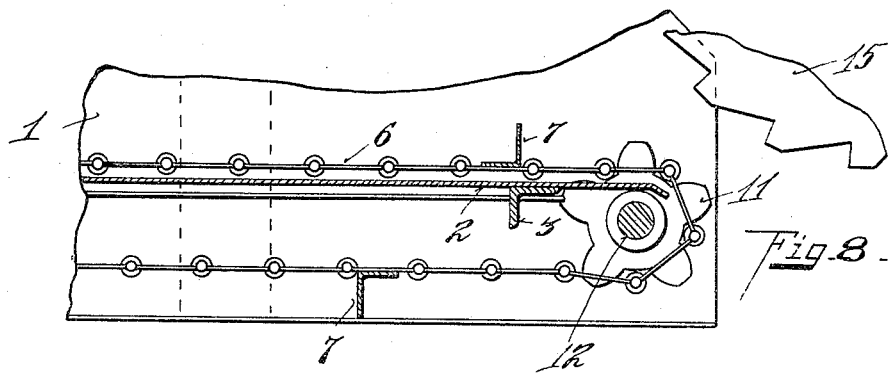

Figure 8 is a longitudinal section through the rear end of the base of the body of the vehicle.

Figure 9 is an enlarged top plan view of the transmission mechanism upon one side of the rear end of the vehicle body for intermittently driving an endless conveyor traversing about the base or floor of the body of the vehicle.

The vehicle illustrated is of two-wheel type for propelling connection with a tractor and of all steel structure for durability, light weight and low cost construction and while preferably is merely selective as it may be of four-wheel horse drawn or other type, and it is also optional as to the material employed in its construction.

Referring to the drawings, I indicates the vehicle body, with the floor, opposite longitudinal side walls and front end wall of sheet metal structure. The floor 2 is secured to a plurality of spaced angle iron cross bars 3 (see Figure 4). The cross bars 3 at the opposite longitudinal ends are fixed to a pair of sills 4, each of channel form in cross section, extending longitudinally of the body and relatively at the opposite sides thereof to which the side walls respectively are also fixed and each having its channel inward. The lower flange 5 of each sill is of extended width dimension and jointly provides a pair of rails for an endless conveyor 6, traversing longitudinally about the floor 2, as above and below the same, with the upper run or span of the conveyor above and traveling upon the floor while the return run or span travels therebeneath and is sustained and traverses upon the lower flange 5 of the sills.

The conveyor consists of a pair of sprocket chains, one respectively for each of the opposite longitudinal ends of the conveyor and joined at spaced intervals by angle iron cross bars 7, for scrapingly conveying the material loaded in the body to a discharge end thereof. The chain links are of well-known conventional construction in which the ends of the links are interfittingly pivotally connected.

The chain for the forward or active run of the conveyor traverses bearingly upon the floor to the relief of the cross bars 7, while for the return run, the laterally extended flanges of each of the cross bars 7, at their opposite ends, bear edgewise and traverse upon the lower flange 5 of each of the sills 4, the sills confining and encasing the same within the base of the body. This is of material advantage as relieving the transmission from carrying any conveyor depressing load weight, particularly for a large load carrying vehicle body as the conveyor extends the full length thereof.

Each chain of the conveyor at the forward end of the body (see Figure 3) is engaged with and about an idler sprocket wheel 8, loosely journalled upon a stub shaft 9, traversing an elongated slot through the sill and side wall of the body and fixed upon and laterally extending from a bracket 10, adjustably mounted upon the exterior side of a wall of the body. This provides ready accessibility for adjusting the tension of the conveyor chain.

The opposite loop ends of the conveyor chains, at the discharge end (see Figures 8 and 9), each, is engaged with and about a respective driving sprocket wheel 11 fixed upon a shaft journalled within suitable bearings in the opposite longitudinal sides of the vehicle body.

One end of the driving shaft 12 fixedly carries a ratchet wheel 13 and the shaft is extended to locate the transmission means exterior of the body. The ratchet wheel comprises an element of the transmission means for intermittently transmitting the conveyor which will be subsequently described and in detail may be considered separate and apart hereof, as various methods may be employed for transmitting the conveyor and its control.

The rear end of the body being open, the side walls thereof for added stability connect with and are joined by an arch frame 14, which extends above the height of the body and is also utilized as a support for journal or bearing brackets for an upper or second disintegrating and distributor roll.

A rotative material disintegrator and distributing roll 15 is disposed immediately above and at the discharge end of the conveyor. The roll is composed of a plurality spiral peripherally toothed or serrated vanes 16, extending crosswise for approximately the full width of the body. The vanes are of sheet metal material, extending radially from and about a tubular arbor to which they are welded or integrally joined and the tooth design may be comparative to that of a circular saw in the flat, excepting that the vane being of helical form upon its arbor the inclined edges of each tooth follow the helix, so that the teeth in the rotative motion of the roll impart a side-wise shearing and rasping action upon the material encountered, thereby cutting, shredding, disintegrating and conveying the same. The vanes also centrifugally disperse the material in a direction rearward and sidewise from the body of the vehicle. This with a manure material, which usually is condensely packed with straw or vegetable fibrous matter is finely severed and separated from the bulk urged thereagainst by the conveyor and readily dispersed by the rotative velocity of the vane for a uniform distribution of the resulting product upon the soil.

The plural number of vanes compounds the action, increasing the effective capacity of the roll per cycle of revolution and at a slower speed rate. It increases the shredding action and results in a more thorough pulverization of the material and uniform quantity dispersion for a maximum width of spread and by varying the rate of feed the distribution quantity can be more determinately regulated. It also provides for an exceedingly smooth operation, to the relief of any pounding action to break the manure into small fragments due to its shearing characteristics.

The shape of the teeth and direction of rotation are such that the radial or perpendicular edges of the teeth for their active period in a cycle move in an ascending direction.

The vanes for one-half of the length of the distributor are in relative opposing helix or helical arrangement to that for the second half and meet centrally of the length of the unit, thereby combined as right and left helix sections and stationed upon the arbor so that a right hand helix is employed for the left half of the distributor and a left hand helix for the right half of the distributor, and which are correspondingly followed for a number of vanes embodied in a roll. This avoids any conveying or compacting influence of the material toward and against an end bearing supporting wall of the body and assures maximum width of and distribution on each side of the vehicle.

As a facility in the manufacture of the distributor roll the vanes are formed in sections, each section normally constituting a flat rectangular length of sheet metal appropriately toothed along one edge, as the outer edge when applied upon an arbor. Preferably for a half length of the distributor it comprises three sheet sections, as illustrated in Figure 7. The sheet sections comparatively are duplicates and can be more conveniently applied and welded to a given helical pitch gauge upon the arbor without undue twist or distortion. A plural number of vanes, as a double lead, for example, for one turn or cycle of the vane about the arbor at the peripheral extremity of the helix may be at 16" pitch which for a double lead provides an 8" pitch.

The arbor of the distributor roll has a shaft 17 concentrically engaged therethrough and fixed thereto as a unit, as by an intervening bushing respectively within each of the opposite ends of the arbor. One end of the shaft is extended to project into and journalled within a transmission casing 18, housing a pair of intermeshing bevel gears, one fixed upon the end of shaft 17 and the second upon a shaft 19. The shaft 19 extends longitudinally parallel with a relative side wall of the body to the forward end thereof at which it is suitably bearing supported. The forward end of the shaft 19 carries a sprocket wheel transmitted by an endless sprocket chain 20 in engagement with a sprocket wheel fixed upon the end of a shaft 21, journalled and supported within a suitable bearing mounted upon the hitch tongue or bar 22, extending centrally from the forward end of the vehicle body. The shaft 21 extends longitudinally of the hitch and its forward end is provided for making a coupling connection with the transmission means of a tractor to which the vehicle is transportingly coupled and intervening of its length is equipped with a knuckle or flexible joint. It is obvious and recognized that other means and methods may be employed for supplying the transmitting power for the spreader and conveyor mechanism.

A second disintegrator and distributor roll 23, designated as an upper roll, which in structure duplicates the lower roll 15 is located in a forward off-set and elevated relation from the lower roll. The transmitting shaft 17 for the upper roll is journalled in a pair of brackets 24, 24, respectively mounted upon a relative vertical post of the arch frame 14 of the vehicle body. The upper roll is transmittingly connected with the lower roll by means of a sprocket chain 25 engaged with sprocket wheels, one respectively upon each of the shafts 17 of the rolls.

The transmission for the conveyor of which the ratchet wheel 13 is an element is in driven connection with the shaft 19, which rotates the distributor rolls, and as illustrated in Figures 5, 6 and 9 comprises a worm and worm gear intermeshingly engaged, journalled and housed with a casing 27. The casing 27 is fixed upon the exterior side of a side wall of the vehicle body and is traversed by the drive shaft 19 and upon which the worm within the casing 27 is fixed. The worm gear within the casing 27 is mounted upon and fixed to a crank shaft 28, journalled in said casing having its crank arm exterior thereof which pivotally connects with one end of a link 29. The opposite end of the link 29 pivotally connects with a pawl carrying rocker lever 30, pivotally mounted upon a tie-link 31, which extends between and connects with the transmission casing 27 and the conveyor driving shaft 12.

The rocker lever 30 pivotally supports a pair of superposed pawls 32, 32, of relatively different length and at opposite sides of the fulcrum axis of the rocker lever. Each pawl has its toothed end in cooperative engagement with the toothed periphery of the ratchet wheel 13 to intermittently rotate the same. Thus in the oscillating movements of the rocker lever the pawls alternately and successively actuate the ratchet wheel in step degrees. The pawls are yieldingly urged into contacting engagement with the toothed periphery of the ratchet wheel by a spring 33 having one end connected with the upper pawl 32 and its opposite end with a clip 34 fixed to the lower pawl 32. Reverse rotation of the ratchet wheel is locked by a latching pawl 35, mounted upon and extending from the rocker lever 30.

The degree of ratchet wheel rotation can be varied or regulated within the maximum length of stroke movements of the pawls administered by the rocker lever, by a cam 36, pivotally mounted upon the conveyor drive shaft 12, which limits and governs that activity of the pawls for engagement with the ratchet wheel in their stroke movements. Each pawl has a lip 37 projecting laterally from its tooth end to engage upon the controlling edge of the cam which lifts or elevates the pawl from the ratchet wheel for a determined degree of its stroke.

The position of the cam in the present instance is remotely controlled and regulated by ratchet means 38, mounted upon the vehicle body and in crank and link connection with an arm 39 extending from the cam 36. The ratchet means 38 has a pull cord 40 in coupling connection therewith, the cord extending forward of the vehicle body for manipulating grasp by the driver of the tractor to which the spreader is coupled. The ratchet mechanism with each forward stroke or pull of the cord, rotatively advances the crank thereof in step degrees, correspondingly swinging the cam 36 in a forward and reverse direction in a rotative cycle of the crank, moving and setting the cam to a controlling or regulating position of either preventing engagement of the pawls 32, 32, with the conveyor transmitting ratchet wheel 13 or time of connection therewith in a forward or power stroke governed by the number of teeth alloted within the stroke movement of the pawls. The feed thus can be readily controlled, either arrested or the degree of its inching movement regulated by one or several pulling strokes of the cord.

Having described my invention, I claim:

A fertilizer distributor, comprising a vehicle body, an endless conveyor transmitted upon and about the floor of the body for moving the fertilizer material contained in the body to the discharge end thereof and a material disintegrating and distributor rotor journaled upon said body and extending cross-wise thereof at the delivery end of the conveyor, whereby the material in the body is delivered directly thereagainst, the rotor having a plurality of helicoid vanes longitudinally and diametric thereof, each vane subdivided into a pair of oppositely directed helicoid flights, each flight describing approximately a single revolution with the inner end of the pair of flights joined into a common leading radial edge, the vane of each flight having a toothed periphery which acts upon the material delivered thereagainst, each tooth in plane with the vane having a radial edge and an angular edge directed to the outer end of its respective flight and in relief from the head end of the radial edge with which it joins.

EROS VALENTINE BARKER.

REFERENCES CITED

The following references are of record in the file of this patent:

UNITED STATES PATENTS

| Number | Name | Date |
|---|---|---|
| 954,137 | Rowley | Apr. 5, 1910 |
| 982,220 | Whitely et al. | Jan. 24, 1911 |
| 1,879,114 | Crumb et al. | Sept. 27, 1932 |
| 2,144,361 | Butter et al. | Jan. 17, 1939 |
| 2,221,266 | Roach | Nov. 12, 1940 |
| 2,256,815 | Raney et al. | Sept. 23, 1941 |
| 2,274,481 | Johnston | Feb. 24, 1942 |
| 2,293,977 | Hoffstetter | Aug. 25, 1942 |